United States Patent Office 2,761,872
Patented Sept. 4, 1956

2,761,872

SUPPRESSION OF SPONTANEOUS IGNITION

Victor A. Hann, St. Davids, Pa., assignor to The Welsbach Corporation, Philadelphia, Pa., a corporation of Delaware No Drawing. Application May 3, 1955, Serial No. 505,837

2 Claims. (Cl. 260—514)

This invention relates to processes for the suppression of spontaneous ignition and more particularly to processes for the suppression of spontaneous ignition applied to systems in which ozone is employed to oxidize various unstable chemical compositions which are prone to ignite spontaneously during reaction with ozone.

It has been recognized that various unstable chemical compositions are prone to ignite spontaneously during reaction with ozone. I have found that such spontaneous ignitions or explosions do not occur when using ozonized air in the reaction but frequently occur when using ozonized oxygen in the reaction. Most unexpectedly I have found that when small amounts of carbon dioxide are added to ozonized oxygen a remarkable ignition suppression effect is obtained and this discovery is the basis of the novel processes of the present invention.

The temperatures at which spontaneous ignition takes place when oxygen-ozone mixtures are used to ozonize an unstable chemical composition are not constant for any given reaction but are determined by other factors such as temperature, ozone concentration, particularly diluent involved, specific ozonide involved, type of ignition source, and the geometry of the reaction system. Thus the ignition temperatures at which explosions occur are not characteristic of the igniting substance alone. In this connection see Chemical Engineers Handbook (2nd edition, page 2397).

It is therefore manifestly impractical to determine the amount of carbon dioxide to be added to any given unstable organic composition to suppress spontaneous ignition thereof without regard to the system in which the reaction is taking place and it is necessarily within the scope of the present inventive concept to determine for each system in which the reaction is taking place the temperature at which spontaneous ignition occurs and the most efficient amount of carbon dioxide which must be employed to suppress explosions.

It is accordingly an object of the present invention to provide novel processes for the suppression of spontaneous ignition in oxygen-ozone reactions with unstable chemical compositions in which carbon dioxide is added to the reaction in controlled amounts to suppress spontaneous ignitions.

Another object of the present invention is to provide such novel processes for the suppression of spontaneous ignition in any system in which an oxygen-ozone mixture reacts with an unstable chemical composition when the ignition temperature for the particular system has been determined.

Other and further objects of the present invention will appear from the following description of an illustrative example of the same.

A typical unstable chemical composition subject to spontaneous ignition when in reaction with an oxygen-ozone mixture is α-pinene. α-Pinene is 2,6,6-trimethyl-bicylo-[3.1.1]-2-heptene and is obtained from turpentine. Oxidation of α-pinene provides certain useful acids employed in lubricants and plasticisers. The spontaneous ignition characteristics of α-pinene when reacted with an oxygen-ozone mixture as compared to an air-ozone mixture is shown by the following table:

Table I

| Experiment | Ozone Concentration, percent | Diluent | Temperature °C. | Observation |
|---|---|---|---|---|
| A | 3 | Air | 140 | No ignition. |
| B | 3 | ----do---- | 115 | Do. |
| C | 2 | Oxygen | 100 | Violent ignition. |
| D | 2 | ----do---- | 110 | Do. |
| E | 2 | ----do---- | 100 | Do. |
| F | 2 | ----do---- | 110 | Do. |
| G | 2 | ----do---- | 100 | Do. |

The temperature shown in Table I is the "ignition temperature" and is determined not only by the unstable α-pinene but by other characteristics of the system as pointed out above.

In accordance with the processes of the present invention when small amounts of carbon dioxide are added to the ozonized oxygen before α-pinene is reacted with the ozone a most unexpected and remarkable ignition suppression is obtained. As little as 1% by volume of carbon dioxide has provided ignition suppression and at higher ignition temperatures as much as from 45 to 50% by volume of carbon dioxide may be used to suppress spontaneous ignitions. Table II below shows various examples of the suppression of spontaneous ignition in α-pinene when ozonized by an oxygen-ozone mixture:

Table II

| Exp. | $O_3$ Conc., percent | $CO_2$ Conc., percent | Temperature, °C. | Observation |
|---|---|---|---|---|
| C | 2 | 0 | 100 | Violent ignition. |
| D | 2 | 0 | 110 | Do. |
| E | 2 | 0 | 100 | Do. |
| F | 2 | 0 | 110 | Do. |
| G | 2 | 1.2 | 140 | No spontaneous ignition. |
| H | 2 | 1.2 | 140 | Do. |
| I | 2 | 3.9 | 140 | Do. |
| J | 2 | 3.9 | 140 | Do. |
| K | 2 | 5.75 | 140 | Do. |
| L | 2 | 4.5 | 145 | Do. |
| M | 2 | 4.5 | 145 | Do. |
| N | 2 | 4.5 | 150 | Do. |
| O | 2 | 3.4 | 140 | Do. |
| P | 2 | 3.4 | 150 | Do. |
| Q | 2 | 2.6 | 150 | Do. |
| R | 2 | 2.6 | 140 | Do. |
| S | 2 | 45.0 | 150 | Do. |

The temperatures reflected in Table II are the "ignition temperatures" which are determined not only by the α-pinene but also by the physical characteristics of the system.

I have found that other unstable organic compositions which are prone to ignite spontaneously during reaction with ozonized oxygen will react similarly to α-pinene when carbon dioxide is used with the ozonized oxygen and the processes of the present invention should not be construed as limited only to α-pinene or to the particular examples thereof described above.

It should also be understood that the invention is not limited to the specific ignition temperature range shown in Table II since this temperature range is determined not only by the unstable organic compound but by the configuration of the system, and will be determined for each individual system in which spontaneous ignition occurs to determine the most efficient amount of carbon dioxide to use in the system for suppression of spontaneous ignitions.

It should also be understood that the present invention is not limited to the addition of carbon dioxide to the ozone-oxygen mixture. The present concept includes controlling the volume of carbon dioxide which may be present in the mixture as when the oxygen, depleted by the removal of ozone, is recycled through the ozonator for further generation of ozone. The invention also includes the concept of diluting the oxygen with the most efficient amounts of carbon dioxide before the oxygen passes through the ozonator.

It should now be apparent that the present invention in every way satisfies the several objectives described above.

Changes in or modifications to the above described illustrative embodiment of the novel processes of the present invention may now occur to those skilled in the art without departing from the present inventive concept. Reference should therefore be had to the appended claims to determine the scope of this invention.

What is claimed is:

1. In the ozonization of $\alpha$-pinene with an oxygen-ozone mixture which reaction is subject to spontaneous ignition, the steps of diluting the oxygen with from 1 to 50% by volume of carbon dioxide, ozonizing the oxygen-carbon dioxide mixture, reacting the oxygen-carbon dioxide-ozone mixture with $\alpha$-pinene whereby spontaneous ignition is suppressed and then cycling the ozone depleted oxygen-carbon dioxide mixture back for ozonizing.

2. In a process for suppressing spontaneous ignition during the oxidation of $\alpha$-pinene by an oxygen-ozone mixture at temperatures in the range of from approximately 100° C. to 150° C., the step of adding from 1% to 50% by volume of carbon dioxide to the oxygen-ozone mixture before reaction with the $\alpha$-pinene.

References Cited in the file of this patent

UNITED STATES PATENTS

| | | |
|---|---|---|
| 1,815,985 | Pansegrau | July 28, 1931 |
| 1,902,550 | Forrest et al. | Mar. 21, 1933 |
| 2,552,278 | Hochwalt | May 8, 1951 |

OTHER REFERENCES

Simonsen: The Terpenes, vol. II, page 140, 1949.